Feb. 26, 1957 J. FIEUX 2,783,004
APPLIANCE FOR BRAKING OF AIRCRAFT ON
LANDING OR FOR LAUNCHING OF SAME
Filed March 21, 1955 5 Sheets-Sheet 1

INVENTOR
Jean Fieux.
BY
Cameron, Kerkam + Sutton
ATTORNEYS

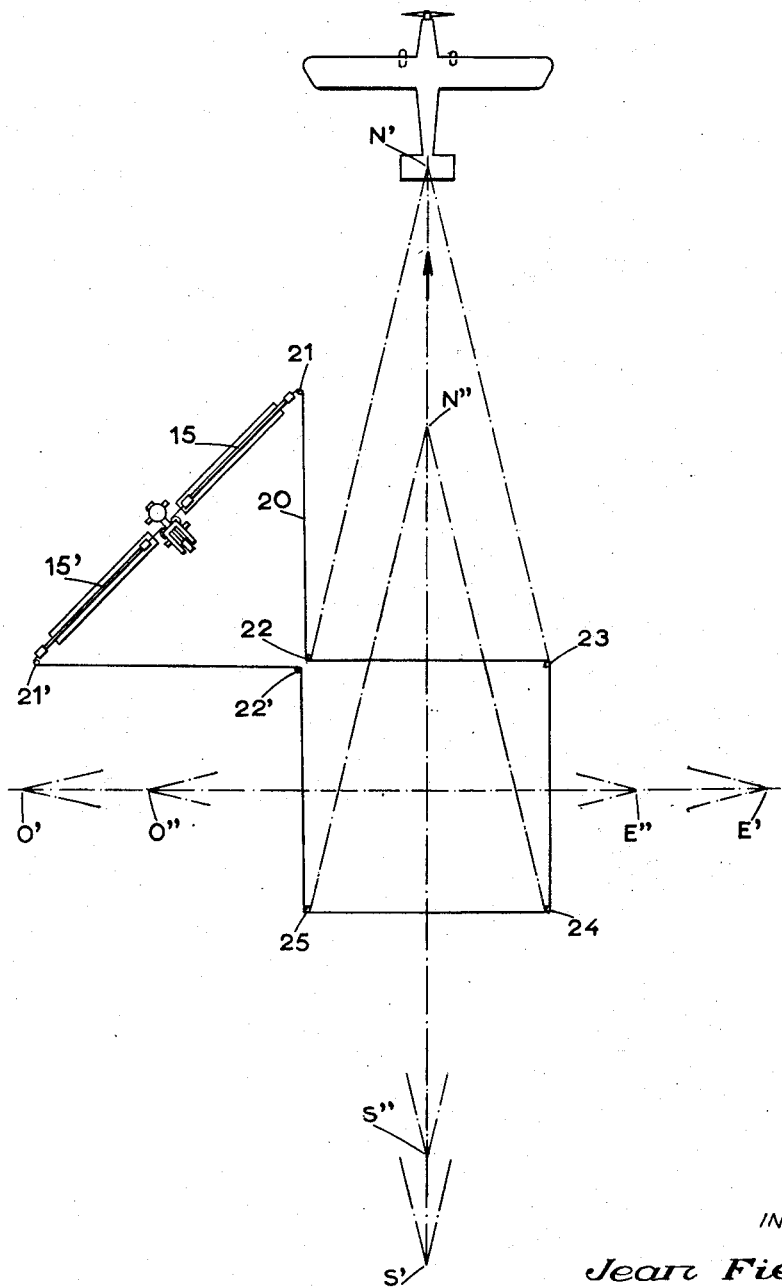

Feb. 26, 1957 J. FIEUX 2,783,004
APPLIANCE FOR BRAKING OF AIRCRAFT ON
LANDING OR FOR LAUNCHING OF SAME
Filed March 21, 1955 5 Sheets-Sheet 5

INVENTOR
Jean Fieux
BY
Cameron, Kerkam + Sutton
ATTORNEYS

United States Patent Office 2,783,004
Patented Feb. 26, 1957

---

2,783,004

APPLIANCE FOR BRAKING OF AIRCRAFT ON LANDING OR FOR LAUNCHING OF SAME

Jean Fieux, Paris, France, assignor of one-half to Société des Forges et Ateliers du Creusot, Paris, France Application March 21, 1955, Serial No. 495,741

Claims priority, application France March 29, 1954

8 Claims. (Cl. 244—63)

This invention relates to an appliance for the braking of aircraft on landing or for the launching of aircraft and has for its object to provide such an appliance which is easily transportable and which can be easily and rapidly installed on a temporary landing site and easily and rapidly dismantled and transported to another site.

This appliance is of the type in which an aircraft is hooked on to a cable stretched out at a small distance above the ground. The present invention enables an aircraft to land or be launched in any direction depending on the direction of the wind, without having to change the orientation of the appliance on the site.

According to the invention the appliance comprises a hydro-pneumatic device adapted to operate alternatively as a motor and as a recuperator, constituted by a working cylinder in which a piston is slidably mounted and subject to the action of a liquid supplied from a container in communication with the said cylinder and containing a gas under pressure, said piston being fixedly attached to a movable block of a primary tackle which includes a second fixed block and two cables connected to a movable block of two secondary tackles effecting the purchase of the two ends of a single cable guided by an assembly of pulleys having vertical axes disposed on the site in such a manner as to constitute with said cable a network having substantially the shape of a parallelogram.

In order that the invention may be more clearly understood one particular embodiment thereof will now be described, by way of example, with reference to the accompanying diagrammatic drawings, in which:

Figures 4, 5 and 6 show on a smaller scale the assembly diagrams of the installation in the position in readiness for braking; at the end of a braking course, and at the beginning of a catapulting action, respectively;

Referring to these drawings the motor-recuperator device comprises a cylinder 1 in which is slidably mounted a piston 2 provided with a sealing ring 3 and guided outside the cylinder 1 by means of guide runners 4—4 engaging into tracks 5—5' integral with a frame 6 supporting the device.

Figure 3:
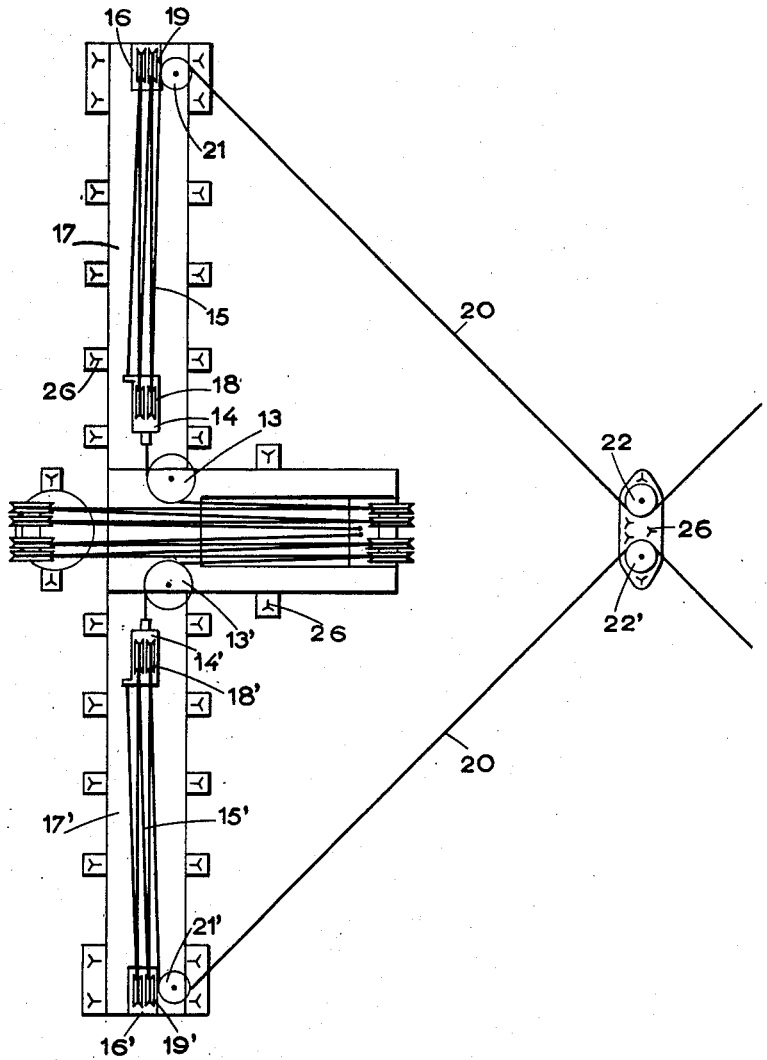
Figure 3 is a plan view showing the disposition of the tackles.

On the frame 6 a primary tackle is mounted which comprises a fixed block 7 integral with the frame, a movable block 8 attached to the rod of the piston 2, and two cables 9—9' attached at their ends to lugs 10—10' integral with the movable block 8. Each of these cables is passed round two pairs of pulleys 11—11' and 12—12' mounted on the blocks 7 and 8 respectively. The two cables are deflected in two opposite directions perpendicular to the axis of the cylinder 1 by means of pulleys 13 and 13' and are respectively attached to movable blocks 14 and 14' of two secondary tackles 15 and 15' (Figure 3).

The movable blocks 14—14' are guided on two supports 17—17' on which are fixedly mounted two tackle blocks 16—16'.

On the movable blocks 14 and 14' and on the fixed blocks 16 and 16' are mounted pairs of pulleys 18, 18' and 19, 19' respectively, around which a cable 20 is passed which cable is common to both these tackles, the two ends of this cable being attached to the movable blocks 14 and 14', respectively.

Figure 4:
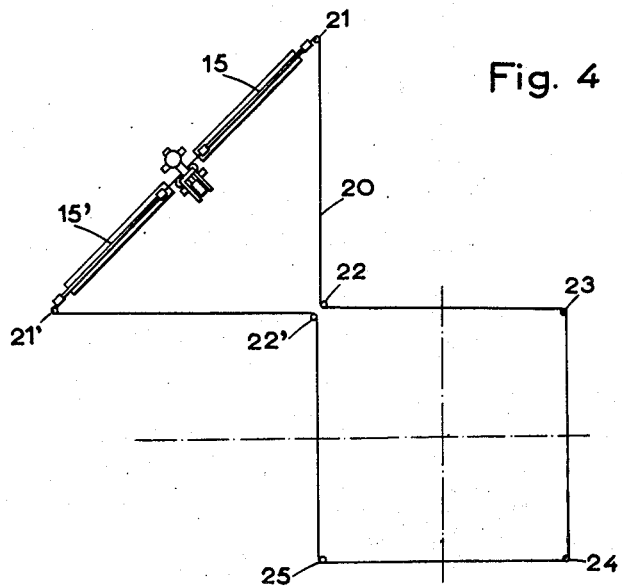

The cable 20 has a length sufficient for allowing its passage, when the two tackles are in their extended position, firstly around the pulleys 21 and 21' mounted on the supports 17 and 17' then around the two pulleys 22 and 22' placed side by side in alignment with the axis of the primary tackle, and finally round three pulleys 23, 24 and 25 positioned in such a manner as to form together with the pairs of pulleys 22 and 22' the four corners of a parallelogram of predetermined dimensions (Figure 4).

The frame 6 of the motor-recuperator device as well as each of the supports 17 and 17' of the tackles and the pulleys 22 to 25 are anchored in the ground by means of anchorage elements 26 of the type used for immobilising certain artillery pieces when firing.

The cylinder 1 is in communication through a conduit 27 of high output to a container 28 which is likewise supported by the frame 6 and which contains a quantity of liquid and of compressed air. This communication is controlled by a spherical non-return valve 29 which may be lifted from its seat by means of a hydraulic jack 30.

A second communication between the container 28 and the cylinder 1 can be established by a conduit 31 in which a low-output valve 32 is fitted.

A pump 33 interposed between the cylinder 1 and the container 28 allows a quantity of liquid desired to be returned to said container 28 from the cylinder 1.

Finally a conduit 34 controlled by a valve 35 connects the container 28 to the hydraulic jack 30.

The appliance functions in the following manner:

When all the components of the appliance are suitably disposed and anchored in the ground, the opening of the valve 32 permits a certain quantity of liquid to pass into the cylinder 1 under the action of the pressure of the air contained in the container 28. The piston 2 moves and by extending the primary tackle and the two secondary tackles, effects the shortening of the cable 20, which assumes eventually a predetermined tension as a function of the pressure of the air contained in the container and forms a network laid out in readiness by means of the pulleys 22 to 25 (Figure 4).

The appliance is then ready to brake the landing run of an aircraft which on landing hooks onto the tensioned cable on one or other sides of the quadrilateral formed by the cable, in accordance with direction imposed by the wind. The aircraft may, for any direction of landing, engage with its hook one or other of the mutually parallel cables, for example that between the pulleys 22 and 23 or 24 and 25, the deflected cable having as the apex the points N' or N" as the case may be (Figure 5). For the three other directions of landing the apices of deflection would be the points E' and E", S' and S", O' and O", respectively.

The deflection of the cable under the action of the pull by the aircraft effects the simultaneous shortening of the two secondary tackles 15—15' and of the primary tackle 9—9', the piston discharging a corresponding quantity of liquid from the cylinder 1 into the container 28, the automatic lifting of the non-return valve 29 permitting a practically free passage of the liquid.

At the end of the braking run the non-return valve 29 drops back onto its seat and cuts off the communication between the container 28 and the cylinder 1. The pressure in the latter is reduced to zero, while the pressure in the container preserves the value attained at the end of the braking.

When it is desired at this moment to use the appliance for a new braking action, it suffices to open again the valve 32 in order to restore the cable to its tensioned position.

Figure 6:
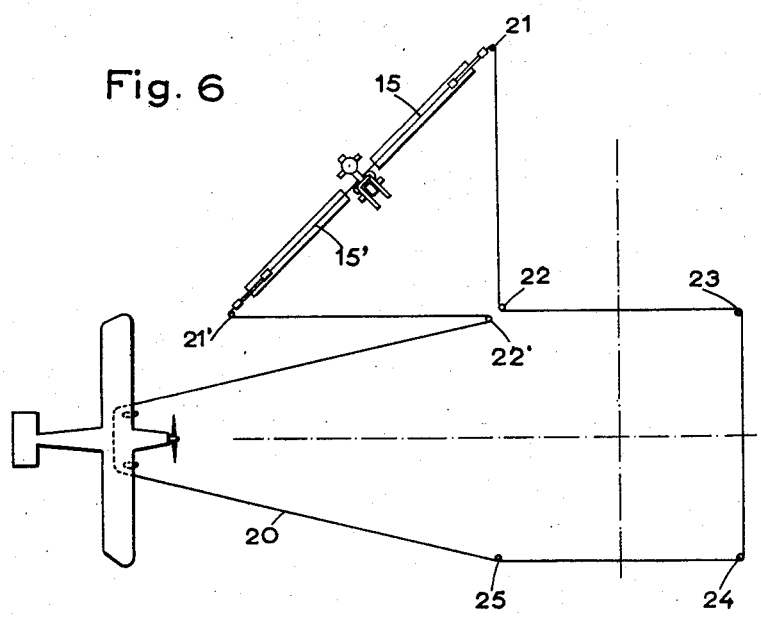

If a braking operation is to be followed by a catapulting operation, it suffices to take up the cable which is in the relaxed condition after the braking operation, to place it into the position imposed by the direction of flight, and to attach the aircraft hook to it (Figure 6).

The launching is then effected by opening the valve 35 in order to put the container 28 in communication with the hydraulic jack 30. The latter lifts the valve 29 and consequently permits the rapid passage of liquid under pressure into the cylinder 1. The piston 2 moves, producing an outward stroke of all the tackles and shortening consequently the cable 20 which, being attached to the two secondary tackles, consequently performs the catapulting function up to the moment when it is stretched to a straight line joining the two pulleys of the base used the aircraft at this moment becoming detached from the cable.

The appliance is then ready for a new braking action.

In the case of two launchings in succession the cable 20 must be restored to the appropriate position by operating the pump 35 so as to return a predetermined quantity of liquid from the cylinder 1 to the container 28; the piston 2 can then move in the cylinder 1 so as to allow by the shortening of the tackles to impart to the free portion of the cable the lengthening imposed upon it by the run of the aircraft on the ground.

In the case of a catapulting operation after a braking operation which had been effected over too short a distance owing for example to a strong head wind or to a too low landing speed of the aircraft, the operation of the pump 33 permits to pay out the cable 20 to the free length required.

Figure 7:
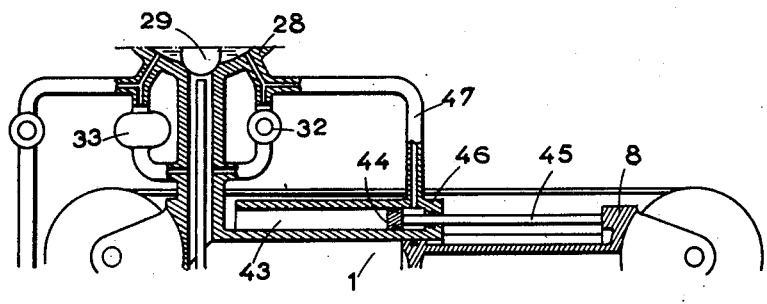
Figure 7 is a part-view similar to Figure 1, showing a modification of the motor-recuperator device.

In the modification of the hydro-pneumatic device as illustrated in Figure 7, an auxiliary cylinder 43 of reduced cross section is mounted on top of and parallel to the working cylinder 1.

In a cylinder 43 is slidable a piston 44 the rod 45 of which is attached to the movable block 8. The working space between the piston 44 and the bottom 46 of the cylinder 43 is put in communication with the container 28 by the conduit 47.

The constant action of the liquid under pressure in container 28 acting through conduit 47 on the piston 44 results in maintaining the liquid in the working cylinder 1 at a predetermined pressure when the non-return valve 29 and the valve 32 are closed.

Thus any risk of un-priming of the pump 33 is eliminated. The pump has the object of supplying to the container 28 a certain quantity of liquid when the cable of the network has to be payed out for a launching operation.

The action of the liquid under pressure on the piston 44 has on the other hand the effect of reducing the traction effort to be applied to the cable of the network in order to restore the same to its extended position.

Figure 1:
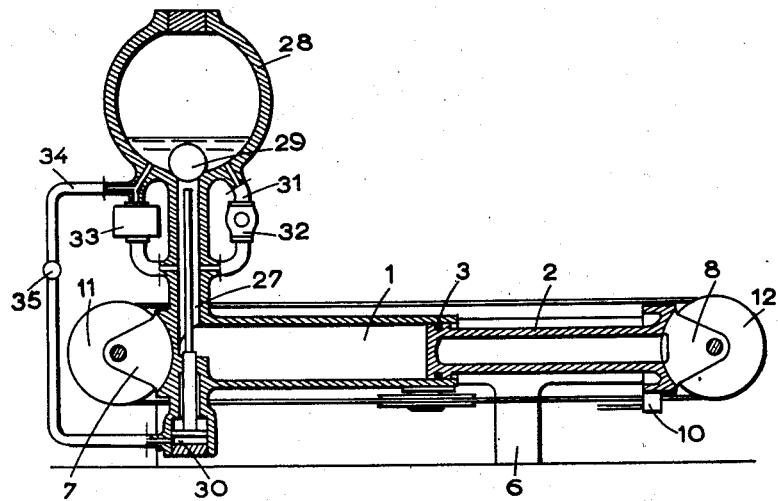
Figure 1 is a sectional elevation, along the line I—I of Figure 2, of the motor-recuperator device.
Figure 2:
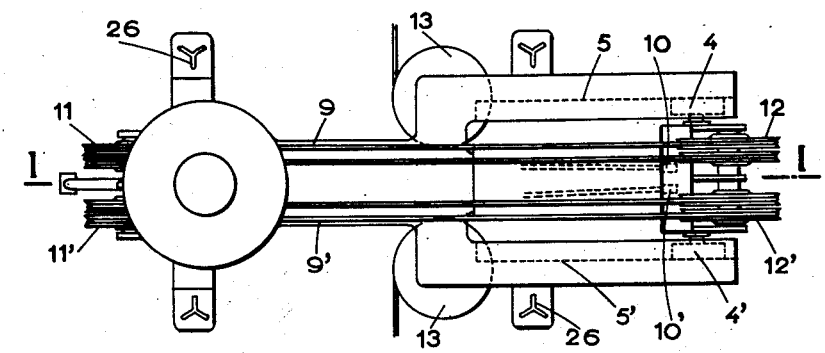
Figure 2 is a plan view of the motor recuperator device.
Figure 8:
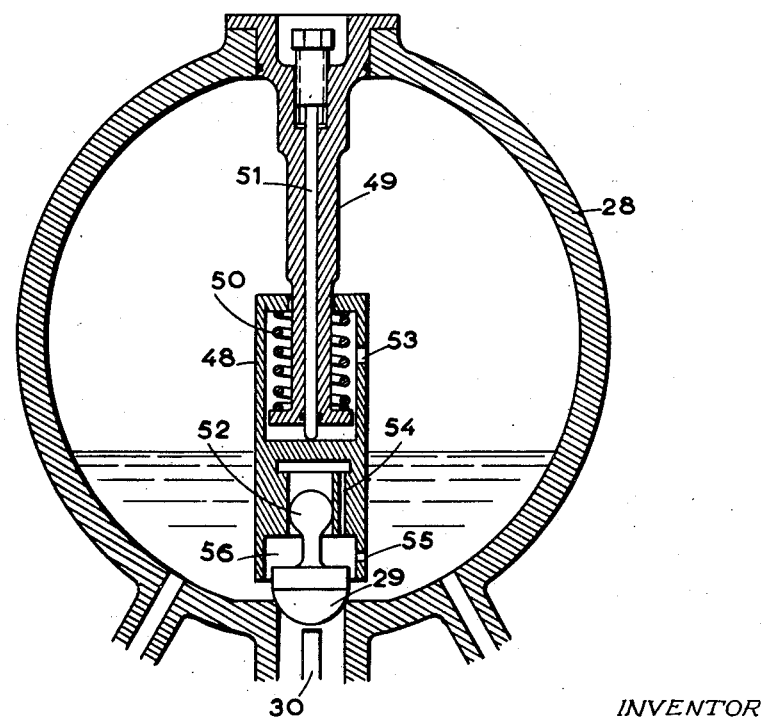
Figure 8 is a section on a larger scale of the pressure container.

The control member for the discharge of the liquid under pressure from the container 28 towards the working cylinder 1, can be constituted by an automatic valve such as shown in Figure 8, instead of by the simple ball valve 29, illustrated in Figure 1.

This valve is constituted by an obturator member 48 which is adapted to slide on a guide plug 49 fixed on the upper portion of the container 28, and is subject to the action of a spring 50 biasing the same against the lower end of a control pin 51 screwed into the guide plug 49. At its lower portion the obturator member 48 serves as a guide to the valve body 29 which for this purpose is provided with a spherical head 52.

Owing to the orifice 53 of any desired cross section area, and to the orifices 54 and 55 of small cross section area provided in the obturator member 48, the action of the pressure acting on the latter is substantially balanced, and the same is held in its raised position as illustrated merely by the action of the spring 50.

When the valve body 29 is raised by the rod 30 of the hydraulic jack, which operation allows the rapid discharge of liquid under pressure into the working cylinder, the obturation member 48 is retained in its raised position by the spring 50 as long as the pressure drop which results from the flow of the liquid between the obturator member and the bottom of the container has not attained a magnitude at which the action of the pressure on the obturator member overrides the opposing action of the spring 50.

If for any reason whatever such as for example the unhooking of the cable or a wrong manoeuvre, the working piston assumes an excessive speed the pressure drop reaches such a magnitude that the obturator member 48 moves at a speed controlled by the orifice 54 towards its abutting on the bottom of the container, and that liquid only which can pass through the orifice 55, continues to supply the working cylinder 1 causing thus the working piston to travel at a reduced speed.

When the outflow ceases, for example when putting the jack 30 out of action has permitted the valve body 29 to drop back on its seat, the pressure is built up again in the cavity 56 above the said valve body, adding its action to that of the spring 50 and the obturator member 48 re-assumes its raised position as illustrated, the obturator assembly thus being put again into a state of readiness for subsequent operations.

In both embodiments of the hydro-pneumatic device described hereinabove the appliance, when performing a braking operation, stores the energy required for the catapulting; in other words it operates practically without the supply of external energy. The action of the valve 32 and, if necessary, of the pump 33, permits the appliance to be put into the conditions required for the operation to be performed, whatever the operation may be.

What I claim is:

1. In apparatus for the braking of aircraft on landing or for the launching of aircraft of the type having a stretched cable engaging the aircraft, a reservoir containing a fluid under pressure, a cylinder communicating with said reservoir, a piston in said cylinder, a primary tackle comprising a fixed block, a movable block carried by said piston and a cable rove on said blocks and having two free ends, two secondary tackles each including a fixed block and a free block each of said free blocks being secured to one of said free ends of said cable, and a second cable having each end thereof rove off as one of said secondary tackles, the bight of said second cable constituting said stretched cable for engaging the aircraft.

2. Apparatus as described in claim 1 including normally closed valve means closing communication between said reservoir and said cylinder and a jack for opening said valve means.

3. Apparatus as described in claim 1 including normally closed valve means closing communication between said reservoir and said cylinder, a hydraulically actuated jack for opening said valve means and means for supplying hydraulic pressure to said jack from said reservoir.

4. Apparatus as described in claim 1 including a passage between said reservoir and said cylinder, normally closed ball valve means closing said passage, a jack for opening said valve means, and normally open spring biased pressure actuated second valve means obturating said passage when excessive pressure drop occurs in said passage.

5. Apparatus as described in claim 2 including a by-pass around said valve means between said reservoir and said cylinder, and manually actuated valve means closing said by-pass.

6. Apparatus as described in claim 2 including a by-pass around said valve means between said reservoir and said cylinder, and a pump mounted in said by-pass for moving fluid from said cylinder to said reservoir.

7. Apparatus as described in claim 2 including a second cylinder of smaller diameter than said first cylinder, a second piston mounted in said second cylinder and connected to said first piston and means for supplying fluid under pressure from said reservoir to said second cylinder behind said second piston whereby movement of said first piston by fluid under pressure from said reservoir is opposed.

8. Apparatus as described in claim 2 including a plurality of fixed guide pulleys defining a rectangular parallelogram the bight of said second cable engaging the aircraft being stretched around said guide pulleys.

References Cited in the file of this patent

UNITED STATES PATENTS

| | | |
|---|---|---|
| 2,145,685 | Chilton | Jan. 31, 1939 |
| 2,432,508 | Cotton | Dec. 16, 1947 |
| 2,474,858 | Nicholson | July 5, 1949 |
| 2,515,205 | Fieux | July 18, 1950 |

FOREIGN PATENTS

| | | |
|---|---|---|
| 663,710 | Great Britain | Dec. 27, 1951 |